Figure 1:
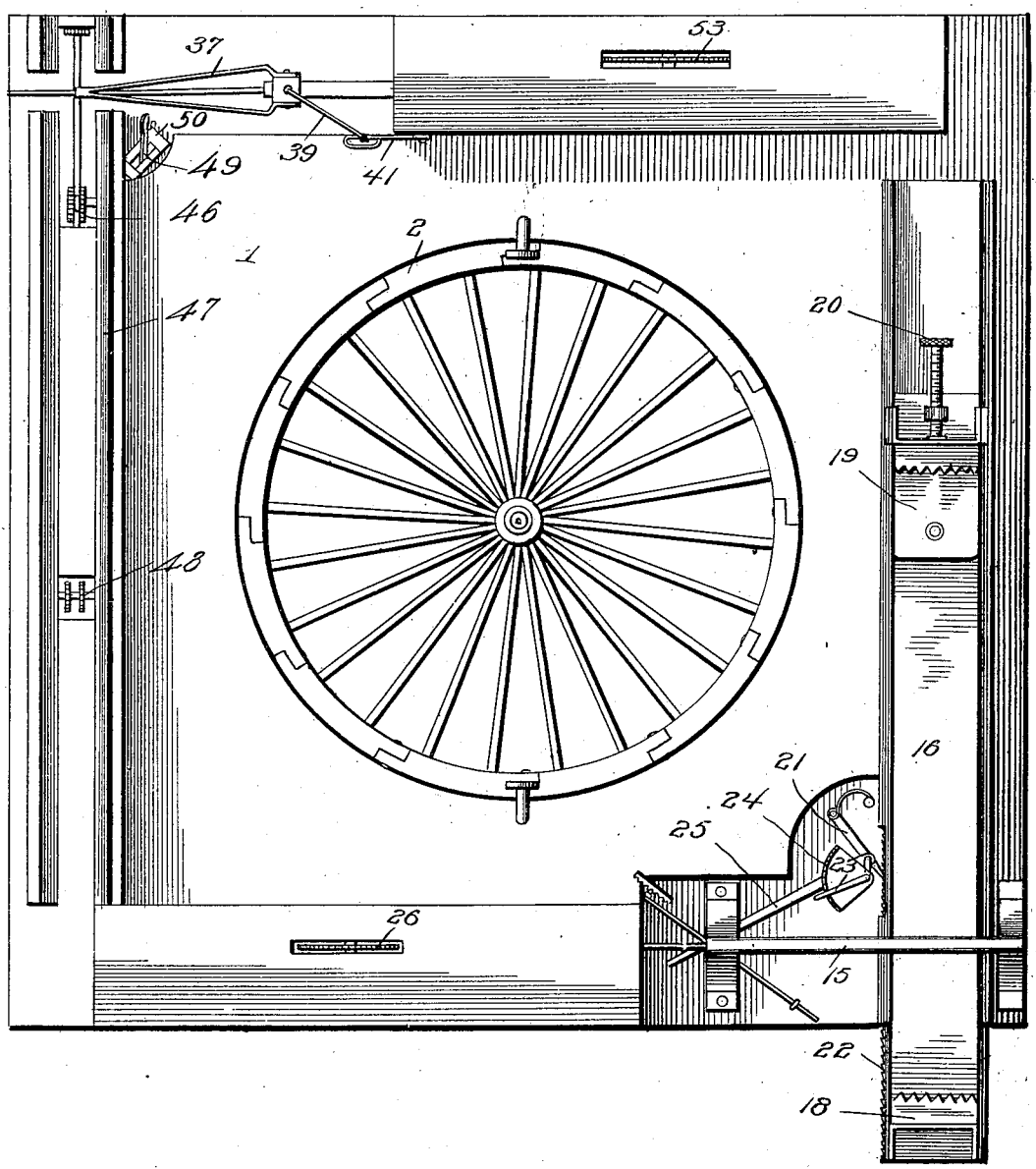

No. 728,753. PATENTED MAY 19, 1903.
O. NORDBERG.
SAWING MACHINE.
APPLICATION FILED SEPT. 28, 1901.
NO MODEL. 4 SHEETS—SHEET 1.

Witnesses
Inventor
Oscar Nordberg,
By Victor J. Evans
Attorney

No. 728,753. PATENTED MAY 19, 1903.
O. NORDBERG.
SAWING MACHINE.
APPLICATION FILED SEPT. 28, 1901.
NO MODEL. 4 SHEETS—SHEET 3.

Witnesses
Inventor
Oscar Nordberg
By Victor J. Evans
Attorney

No. 728,753. PATENTED MAY 19, 1903.
O. NORDBERG.
SAWING MACHINE.
APPLICATION FILED SEPT. 28, 1901.
NO MODEL. 4 SHEETS—SHEET 4.
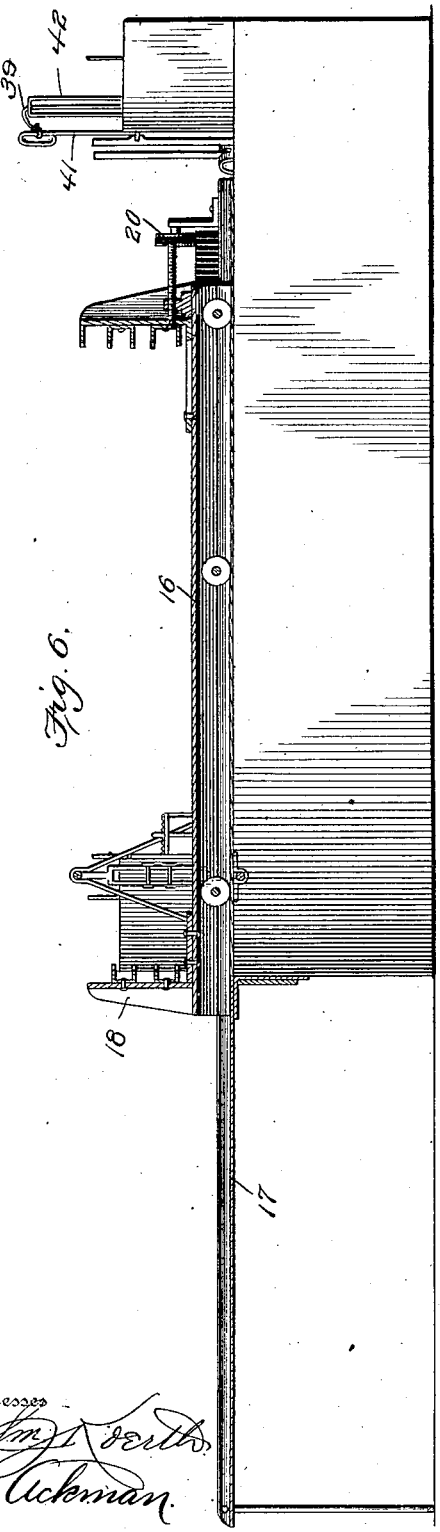
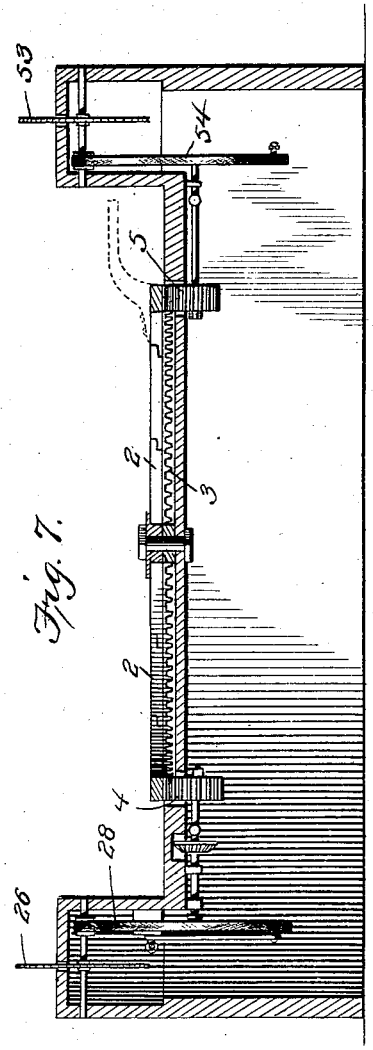
Inventor
Oscar Nordberg
By
Victor J. Evans Attorney
Witnesses No. 728,753. Patented May 19, 1903.

UNITED STATES PATENT OFFICE.

OSCAR NORDBERG, OF LILLEY, MICHIGAN.

SAWING-MACHINE.

SPECIFICATION forming part of Letters Patent No. 728,753, dated May 19, 1903.

Application filed September 28, 1901. Serial No. 76,953. (No model.)

*To all whom it may concern:*

Be it known that I, OSCAR NORDBERG, a citizen of the United States, residing at Lilley, in the county of Newaygo and State of Michigan, have invented certain new and useful Improvements in Sawing-Machines; and I do hereby declare the following to be a full, clear, and exact description of the invention, such as will enable others skilled in the art to which it appertains to make and use the same.

This invention relates to a sawing-machine; and one of the objects thereof is to provide a cheap, durable, and efficient device for splitting logs and sawing them into lengths whereby they may be constructed into unfinished lumber.

Other objects, as well as the novel details of construction, will be disclosed hereinafter, defined in the accompanying claims, and illustrated in the drawings, in which—

Figure 2:
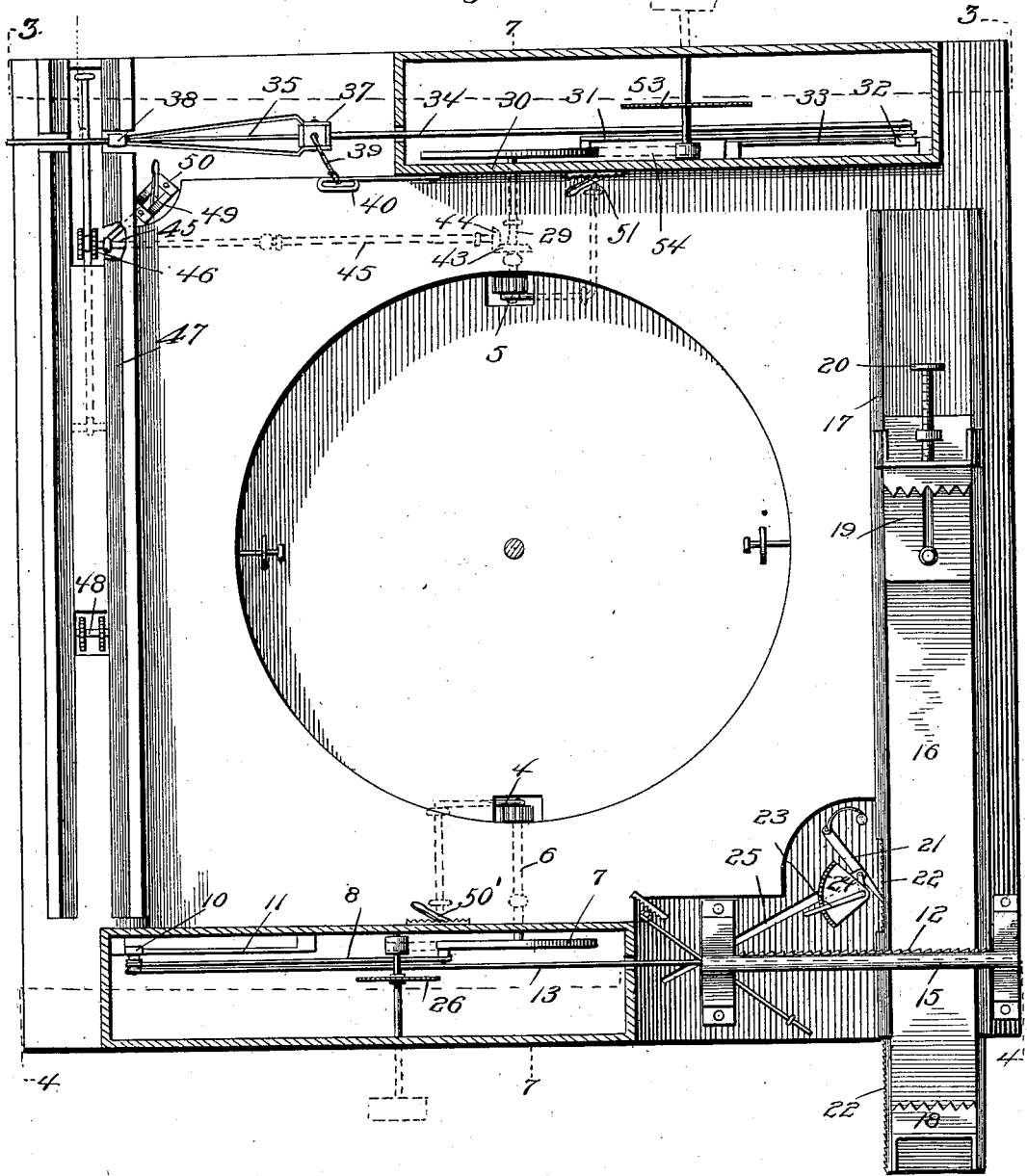
Figure 3:
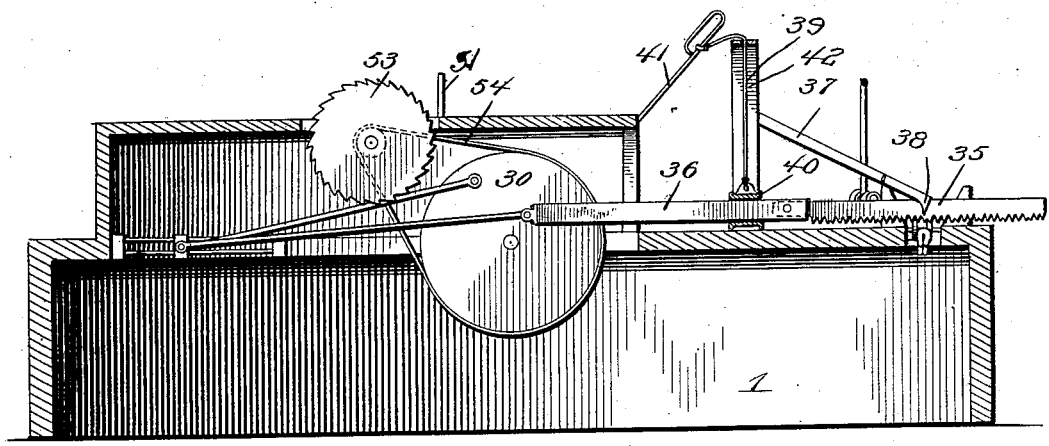
Figure 4:
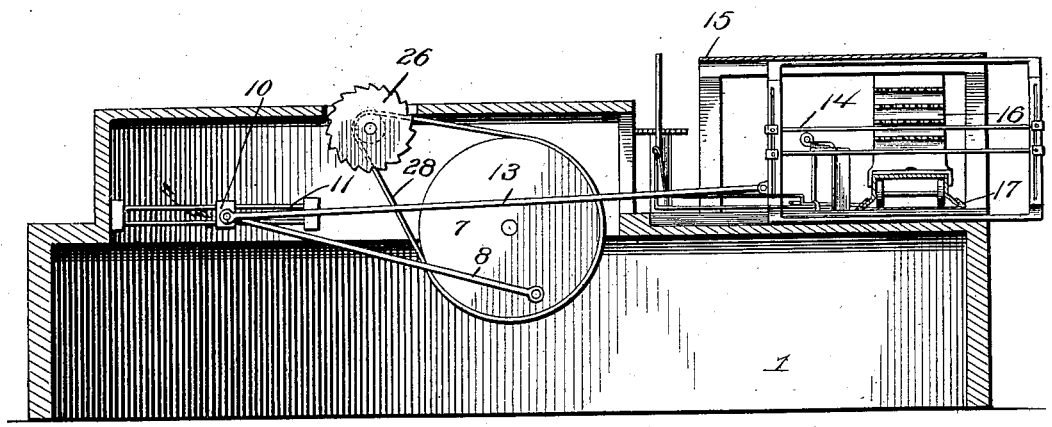
Figure 5:
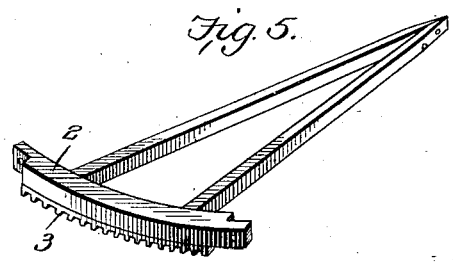

Figure 1 is a top plan view of a saw-machine constructed in accordance with my invention. Fig. 2 is a similar view, partly in section, to illustrate the operating mechanism, the circular-tread power being removed. Fig. 3 is a sectional view on the line 3 3 of Fig. 2. Fig. 4 is a similar view on the line 4 4 of Fig. 2. Fig. 5 is a detail perspective view of one of the tread-power sections. Fig. 6 is a side elevation, partly in section; and Fig. 7 is a sectional view on the line 7 7 of Fig. 2.

The numeral 1 designates a suitable base, on which is arranged the circular-tread power 2, comprising a plurality of segmental sections having overlapping edges near their peripheries, which may be engaged by bolts, so that a continuous tread is made. The periphery of each section is provided with a plurality of teeth 3, which project from the lower face thereof, are designed to engage pinions 4 and 5, oppositely located and supported immediately beneath the tread for the purpose of driving the saws. The saws are arranged on opposite sides of the base and are respectively driven through the medium of the pinions 4 and 5. The pinion 4 is connected to a sectional shaft 6, which engages a drive-wheel 7, connected to an eccentrically-arranged drive-rod 8, which in turn engages a sliding pitman-head 10, reciprocating on guide-rods 11. The splitting-saw 12 is driven by a pitman 13, which is connected thereto and also to the head 10. This saw 12 comprises a rectangular frame, to the ends of which are arranged a plurality of horizonal saws 14, which may be spaced at any predetermined distance apart to provide for the width or thickness of the lumber to be sawed. The saw reciprocates in guides 15, and the material to be split is fed by a traveling feed 16, arranged at right angles to the saws, and is in the nature of a car traveling on a suitable track, as illustrated at 17. On one end of this feed or car are a plurality of serrated parallel rigid flanges 18, which are formed rigid with relation to the car, while on the other end are a plurality of sliding teeth or flanges secured to a removable plate 19, adapted to be adjusted toward or away from the rigid flanges through the medium of a set-screw 20. The material to be split may be secured between the flanges and teeth, so as to be held rigid with relation to the car, and as the car is moved through the medium of the dog 21, which engages the teeth 22 on the edge of the car, the material will be fed into contact with the saws. This dog may be thrown into and out of engagement with the teeth on the side of the car through the medium of a pivoted lever 23, which engages a segmental rack 24, carried by a stand adjacent the side of the car. A lever 25 projects beyond the lever-stand 24 and engages the lever 23, so that said lever and incidentally the dog may be operated by a person at some distance from the car. At a point above the drive-wheel 7 is journaled a disk saw 26, which is driven by a belt 28, passing around the periphery of said drive-wheel 7 and around a pulley on the shaft of the saw. This disk saw may be used for trimming the ends of lumber or for other purposes. On the opposite side of the base to which mechanism just described is situated is located a pinion 5, which drives a sectional shaft 29, engaging a drive-wheel 30, which in turn operates a connecting-rod 31, so as to reciprocate the pitman-head 32, sliding on guides 33. A pitman 34 is connected on one end to the pitman-head and at the other to a crosscut-saw 35 through the medium of a link-bar 36. This saw is normally kept depressed through the medium of a weighted lever 37, having its forward end bifurcated, as at 38, to straddle the saw, said saw being permitted to freely slide between the bifurcated portion of the lever 37. The saw may be raised or elevated, however, by a flexible connection 39, which engages the sleeve 40, through which the link connection 36 slides, said flexible connection being secured to a pivoted lever 41, so that when said lever is thrown back the connection will be forced through an opening in the standard 42, so as to raise the link connection and incidentally the saw above the material to be cut. A beveled gear 43 is secured on the shaft 29 and engages a beveled gear 44, connected to a flexible shaft 45, which in turn drives a plurality of toothed disks 46, below or contiguous to the feed 47 of the crosscut-saw. A pair of idle toothed disks 48 are arranged intermediate the ends of the carriage 47, so that the log or other material may freely slide in said carriage and may be forced toward the saw through the medium of the toothed disks 46. These disks may be instantly elevated or lowered through the medium of a pivoted lever 49, which is secured to a stand 50 and also to the shaft 45. By lowering the shaft the toothed disks will be thrown out of engagement with the material to be cut, which will be necessary until the crosscut-saw has performed its work. By operating the lever 49 so as to throw the teeth into contact with the log or other stuff the same will be thrown forward a sufficient distance to permit the crosscut-saw to engage the material at the proper point, so that even lengths may be sawed. As the log is being moved forward, however, the crosscut-saw will be raised or elevated, as described before, so that all danger of its becoming injured by the log will be obviated. Either the mechanism for the crosscut-saw or that for the ripping-saw may be thrown out of operative engagement with the tread-power 2 through the medium of the levers 50' and 51, respectively. It will be obvious that the pinions 4 and 5, to which the levers 50' and 51 are connected, may be readily lowered out of contact with the teeth on the periphery of the tread-power, inasmuch as the shafts on which said pinions are connected are sectional and the sections thereof are connected by universal joints. A disk saw 53 is journaled above the drive-wheels 30 and is driven through the medium of a band or belt 54.

In the event that it is found desirable to utilize the tread-power as a means for driving machinery a band-pulley may be arranged on the ends of the shafts of the saws 26 and 53, as shown in dotted lines in Fig. 2. The remaining mechanism of the saw will then be detached from operative engagement with the tread-power until such time as will be found necessary to again operate the saws.

It will thus be seen that I have provided a cheap, durable, and efficient machine for splitting and sawing rough lumber into planks, &c., which may be operated from a central source of power and be conveniently controlled by a small number of hands.

While I have illustrated and described a tread-power for driving the mechanism above referred to, it will of course be obvious that steam or other motive power may be employed, if desirable. I therefore reserve the right to make such slight changes and alterations as would properly come within the scope of the claim without departing from the spirit thereof.

Having thus fully described my invention, what I claim, and desire to secure by Letters Patent, is—

In a device of the character described, the combination with a tread-power, of two oppositely-located drive-wheels adapted to be driven by said power, a pitman connected to each drive-wheel, a saw actuated by each pitman, a car arranged adjacent one of the saws and provided with a clamping device for holding the material to be sawed, means for actuating the car so as to feed the material in contact with the saws, a toothed disk arranged adjacent the other saw and adapted to be revolved through the medium of the tread-power whereby the material may be fed to the last-named saw, and means for throwing the disk out of engagement with the material at determined intervals.

In testimony whereof I affix my signature in presence of two witnesses.

OSCAR NORDBERG.

Witnesses:
 Mrs. F. M. CRANDALL,
 ALFRED ELLIS.